Figure 1:
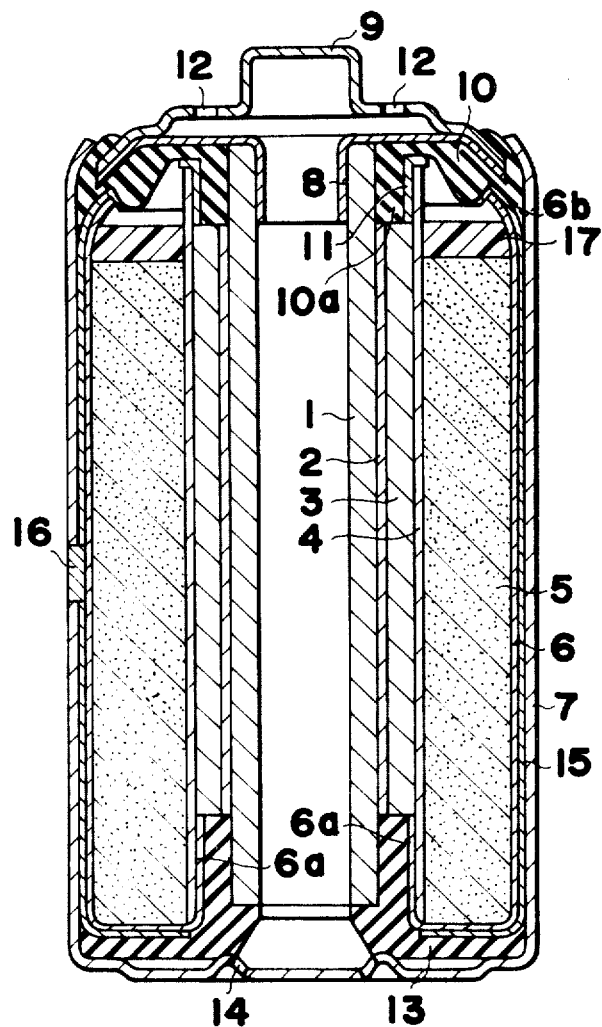

United States Patent [19]
Tsuchida et al.

[11] 3,881,959
[45] May 6, 1975

[54] AIR CELL

[75] Inventors: Takashi Tsuchida, Kosai; Kenichi Shinoda, Toyohashi; Kohei Yamamoto; Tomoya Murata, both of Kosai, all of Japan

[73] Assignee: Fuji Electrochemical Co., Ltd., Tokyo, Japan

[22] Filed: Aug. 2, 1973

[21] Appl. No.: 385,179

[52] U.S. Cl. .............................. 136/86 A
[51] Int. Cl. ............................. H01m 27/00
[58] Field of Search .......... 136/86 A, 133, 135, 109

[56] References Cited
UNITED STATES PATENTS

| | | | |
|---|---|---|---|
| 2,845,471 | 7/1958 | Glesner | 136/133 |
| 2,938,064 | 5/1960 | Kordesch | 136/86 A |
| 3,115,429 | 12/1963 | Reilly et al. | 136/133 |
| 3,661,650 | 5/1972 | Flynn | 136/133 |

Primary Examiner—John H. Mack
Assistant Examiner—H. A. Feeley
Attorney, Agent, or Firm—Eliot S. Gerber

[57] ABSTRACT

In an air cell comprising an outer metal casing constituting an anode terminal of the cell, and an anode inner casing containing anode active mass therein, there is provided an alkaline resistance insulative thin film covering over the outer vertical side surface of the anode casing, and a conductive metal penetrating through the vertical center portion of the insulative thin film to electrically and liquid-tightly connect the anode inner casing with the outer metal casing.

3 Claims, 2 Drawing Figures

AIR CELL

This invention relates to an air cell having a porous carbon tube disposed inside of an anode casing which is enclosed within an outer metal casing with an electrical connection therewith.

A conventional air cell of the type defined above further comprises an oxygen activating catalyst layer provided on the peripheral surface of the porous carbon tube, an tubular ion permeable separator disposed outside of the catalyst layer, and an anode active mass in a gel form disposed inside of the anode casing and outside of the tubular separator. An air coming into an axial space of the carbon tube is dispersed into pores of the porous carbon tube and arrives to a so-called "three phase zones" where ionization takes place. In such structure, when an alkaline aqueous solution is employed as the electrolyte, the electrolyte creeps along narrow clearances between the inner anode casing and the outer metal casing due to electrocapillary action and is apt to be leaked outside of the cell. In order to prevent or decrease such leakage, many proposals have ever been made, for example, the creeping path communicating to the outside of the cell is elongated and narrowed as much as possible, or the amount of the electrolyte to be contained in the cell is decreased.

Furthermore, the volume of the anode active mass is expanded with the advance of electrical discharge as the anode active mass in the gel form is oxidized and as water produced at the "three phase zones" enters into the active mass. Such expansion of the anode active mass causes degradation of the discharge efficiency and leakage of the electrolyte.

Accordingly, an object of the present invention is to provide an air cell having high electrical discharge efficiency without leakage of the electrolyte outside of the cell.

According to the present invention, there is provided an air cell comprising an outer metal casing constituting an anode terminal of the cell, an anode inner casing containing anode active mass therein an electrically connected to said outer metal casing, an porous carbon tube disposed inside of said anode casing, a separator disposed between said anode active mass and said carbon tube, and a perforated metal cover constituting cathode terminal of the cell, the improvement of which further comprises an alkali resistance insulative thin film covering over the outer vertical side surface of said anode casing, and a conductive metal penetrated through the vertical center portion of said insulative thin film to electrically and liquid-tightly connect said anode inner casing with said outer metal casing.

Preferably, an elastic foamed plastic plate is placed upon the anode active mass and pressed against the latter by marginal portion of the anode inner casing.

Figure 2:
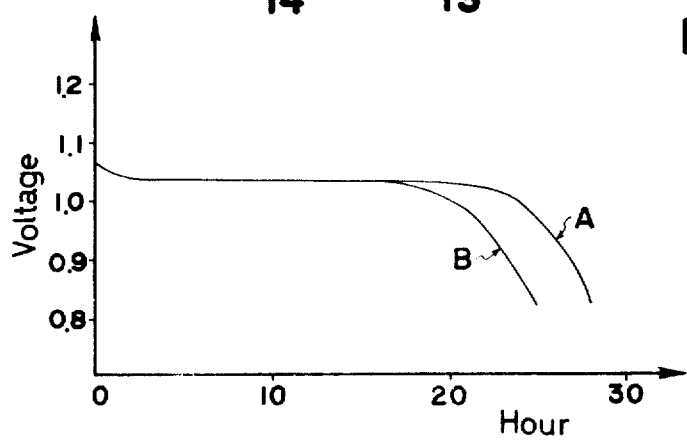

The objects and advantages of the present invention will become more apparent from the following description when taken inn conjunction with the accompanying drawings, in which:

FIG. 1 is a vertical sectional view showing an air cell according to an embodiment of the present invention, and FIG. 2 is a graph showing discharge characteristics of air cells employing zinc anode and alkaline electrolyte, wherein line A shows the discharge characteristic of the air cell according to the present invention and line B shows that of the conventional air cell.

Referring to FIG. 1, a carbon tube 1 is disposed at the axial center portion of the air cell. To form the carbon tube 1, graphite powder constituting main raw material of the carbon tube is mixed with binder of tar and pitch. The mixture is formed into a tube by extrusion molding, which is calcined in the reducing atmosphere at the temperature of about 1000°C and soaked in a suspension of polyethylene, paraffin or polytetrafluoroethylene. Thus soaked tube is dried and then subjected to water-repellent finish, thereby producing the carbon tube having high gas permeability.

Attached to the outer peripheral surface of the carbon tube 1 is a catalyst layer 2. To provide such catalyst layer 2, fine carbon powder is mixed with oxygen activation catalyst such as platinum, rhodium, iridium, osmium, or silver. The mixture is added in a suspension of polytetrafluoroethylene and stirred therewith. Such stirred mixture is formed in the shape of a sheet, which is attached to the outer peripheral surface of the tubular carbon rod 1 under pressure and calcined in an electric furnace.

Provided outside of the catalyst layer 2 is an electrolyte absorption paper 3 having alkali resistance. An ion permeable annular porous separator 4 is disposed outside of the electrolyte absorption paper 3 to electrically separate the cathode carbon tube 1 from anode active mass 5. The anode active mass 5 comprises metal powder of iron, aluminum, magnesium or ainc dispersed in carboxymethylcellulose or polyacrylic soda and alkaline electrolyte, the latter materials being in the form of a gel. The anode active mass 5 is contained in an anode casing 6 which is made of iron plated by tin or zinc.

The anode casing 6 has a bottom center portion 6a folded uprightly to abut against the inner lower portion of the tubular porous separator 4 and an upper marginal portion 6b curled inwardly. The anode casing 6 is enclosed by an outer metal casing 7 constituting anode terminal of the cell.

Provided at the upper end of the carbon tube 1 is a cathode current collector 8 of nickel plated iron of which center portion is folded downwardly to abut against the upper inner vertical surface of the carbon tube 1, thereby allowing air to come in the axial space of the carbon tube 1 from the upper portion thereof. The current collector 8 is in contact with a metal closure cover 9 at its marginal portion, whereby the metal closure cover 9 constitutes the cathode terminal of the cell. The current collector 8 and the metal closure cover 9 are electrically separated from the anode casing 6 and the outer metal casing 7 by a sealing insulator 10 of synthetic resin disposed between the marginal portions of these members 6, 7, 8 and 9. The sealing insulator 10 has an inner vertical portion 10a which abuts against the upper peripheral surface of the carbon tube 1. An annular sealing cap 11 made of iron plated by tin or zinc and having a flange at its upper end is disposed between the inner vertical portion of the sealing insulator 10 and the upper projected portion of the separator 4. The metal closure cover 9 has apertures 12 or perforations therethrough to allow air to enter into the cell.

At the bottom portion of the anode casing 6 is provided a lower sealing insulator 13 of polyethylene, polypropylene or copolymer of polyethlene and polypropylene. Thw lower sealing insulator 13 has a vertical portion 13a which projects between the upright center portion 6a of the anode casing 6 and the lower peripheral surface of the carbon tube 1. The outer metal casing 7 has apertures 14 through bottom center portion thereof in communication with the axial space of the carbon tube 1.

According to the improved structure of the present invention, there is provided an alkali resistance insulative thin film 15 covering over the outer vertical and bottom surfaces of the anode casing 6. To provide such film 15, known methods may be applied. For example, after covering the anode casing 6 with a cylindrical thermo-shrinkage, alkaline resistance synthetic resin such as polyethylene, polyvinyl chloride, or polytetrafluoroethylene, the cylindrical synthetic resin is cohered to the outer surface of the anode casing by heat setting. In other known methods, alkali resistance adhesive or alkali resistance coating may be applied over the outer surface of the anode casing 6.

With the provision of the thin film 15, as the inner anode casing 6 is electrically separated from the outer metal casing 7, in the embodiment shown in FIG. 1, a conductive metal member 16 of circular section penetrates through vertical center wall portion of the outer metal casing 7 and the insulative thin film 15 to ensure electrical and liquid-tight connection therebetween. Such electrical connection may also be effected by spot welding at that portion, or by pouring a welded solder through registered small holes formed respectively through the vertical center portions of the outer metal casing 7 and the insulative thin film 15.

Preferably, an elastic foamed plastic plate 17 is placed upon the anode active mass 5 and pressed against the latter by the curled marginal portion 6b of the anode inner casing 6. The plastic plate 17 is, preferably, an annular shape having thickness in the range of 0.5–10.0 mm and is made of, preferably, foamed polystyrene, foamed polyvinyl chloride, or foamed polyethylene having foaming magnification in the range of from 5 to 70.

In the improved structure of the air cell according to the present invention, as the outer vertical side surface of the anode casing 6 is covered with the alkali resistance insulative thin film 15, the creeping of the alkaline electrolyte along the outer surface of the anode casing 6 due to electrocapillary action hardly occurs. Even if such creeping occurs, the alkaline electrolyte coming up to the vertical center portion of the anode casing 6, where the conductive metal member 16 is liquid-tightly connected to the anode casing through the insulative thin film 15, cannot leak out of the cell. Although the anode casing 6 is electrically connected to the outer metal casing 7 only by single metal member 16, such connection is sufficient to use the outer metal casing 7 as terminal member.

Moreover, when the elastic foamed plastic plate 17 is placed upon the anode active mass 5 and pressed against the latter as shown in the preferable embodiment of the present invention, the following advantages can be obtained:

First, though the volume of the anode active mass is increased by oxidation thereof as the discharge of the cell advances, the increase of the volume is lowered by the elasticity of the foamed plastic plate 17. Accordingly, the electron in the anode active mass 5 has higher conductivity with the result that the discharge efficiency in the present cell is much improved. In FIG. 2, lines A and B show discharge characteristics of the present air cell having the elastic foamed plastic plate 17 and the conventional air cell not having such plate 17 and both being continuously discharged under resistance of 4 $\Omega$.

Second, though the water produced in the cathode side enters into the anode side as the discharge of the cell advances, such produced water is mainly absorbed into pores of the foamed plastic plate 17 with the result that the leak-proof cell is provided.

Third, as the plastic plate 17 prevents air above it from directly contacting to the anode active mass 5, the oxidation of the anode active mass 5 is prevented.

Although the present invention has been described with reference to the preferred embodiment thereof, many modifications and alterations may be made within the sprit of the present invention.

What is claimed is:

1. An air cell comprising an outer metal casing constituting an anode terminal of the cell, an anode inner casing containing anode active mass therein and electrically connected to said outer metal casing, a porous carbon tube disposed inside of said anode casing, a separator disposed between said anode active mass and said carbon tube, upper and lower sealing insulators, and a perforated metal cover constituting a cathode terminal of the cell, the improvement of which comprises an alkali-resistance electrolyte-impervious insulative synthetic resin thin film covering over the outer vertical side surface of said anode casing, a conductive metal member penetrated through the vertical center portion of said insulative thin film, said conductive metal member electrically and liquid-tightly connecting said anode inner casing with said outer metal casing, and an annular foamed plastic plate directly upon said anode active mass, said annular foamed plastic plate being pressed against said anode active mass by a marginal portion of said anode inner casing, said upper sealing insulator having a downward extension which abuts against an upper periphery of said porous carbon tube, said lower sealing insulator having an upward extension which abuts against a lower periphery of said porous carbon tube, wherein said cell contains an air space between a bottom end of said porous carbon tube and a bottom of said outer metal casing, and said outer metal casing has apertures which are in communication with said air space.

2. An air cell as claimed in claim 1, wherein said conductive metal member is a welded solder provided through registered holes formed respectively through the vertical center portions of said outer metal casing and said insulative thin film.

3. An air cell as claimed in claim 1, wherein said foamed plastic plate has foaming magnifications in the range of from 5 to 70.

* * * * *